L. A. ASPINWALL.
Potato-Digger.
No 66,064  Patented June 25. 1867
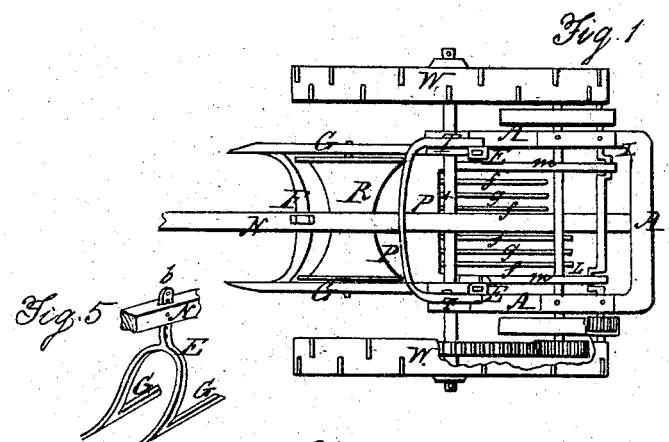
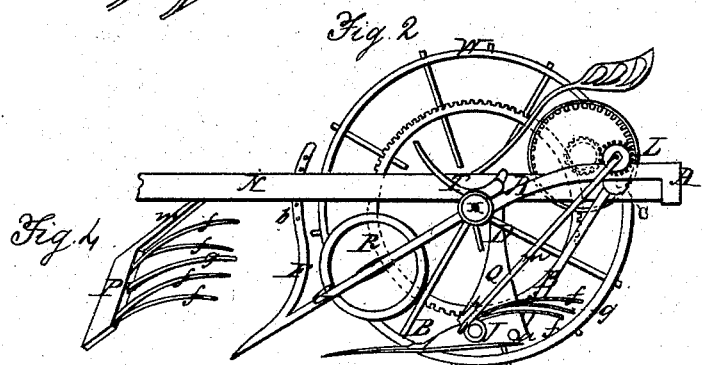
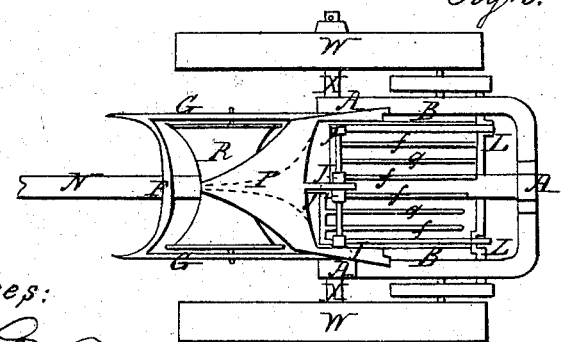
Witnesses:
Inventor:
L. Aug. Aspinwall

United States Patent Office.

L. AUGUSTUS ASPINWALL, OF ALBANY, NEW YORK.

Letters Patent No. 66,064, dated June 25, 1867.

---

IMPROVEMENT IN POTATO-DIGGER.

---

The Schedule referred to in these Letters Patent and making part of the same.

---

Be it known that I, L. AUGUSTUS ASPINWALL, of the city of Albany, State of New York, have invented certain improvements upon the Machine for Digging Potatoes, for which Letters Patent of the United States were granted to me on the 12th day of June, 1866; and I declare the following specification, with the drawings forming part thereof, to be a full and complete description of my invention.

Figure 1 represents a plan view of the machine.

Figure 2 represents a profile view of the same.

Figure 3 a reverse plan view of the same.

Figure 4, a perspective view of one of the separators; and

Figure 5, a perspective view of the vine-fork.

Similar letters denote the same parts of the apparatus.

My improvements consist partly of change of position of some of the parts of the machine, and partly of additional apparatus.

A is the frame of the machine, supported by and upon the wheels W. P is a plough extending across the width of the frame and projecting in front of it. It is a scoop with a plough-point, suspended from the frame by two arms B, which extend backwards below the frame, and are pivoted at C, near the rear of the frame A, and at $a$ to the rear lower corners of the mould-boards Q of the plough. The plough is also supported by two standards, D, projecting upwards from Q, through loops E, on the sides of the frame, and by these standards it can be raised or lowered, and graduated for its work. Bent levers T, connected together at top, are attached to the upper ends of D, with their lower limbs curved, as shown, acting upon the frame as a fulcrum, so that the depression, by the foot of the driver, of their upper parts, shall raise the plough from the ground. In place of frames or screens, to separate the potatoes from the dirt and weeds, I employ what I call separators, which are, as shown in fig. 4, fingers $f$ and $g$, projecting from heads $p$. The heads are continued in the form of rods $m$, which extend obliquely upwards and backwards to cranks L on a shaft lying across the back part of frame A; the cranks being arranged, the one opposite to the other, so as to alternate the movements of the fingers back and forth. Movement is given to the shaft by cog-wheels upon its outer ends, receiving action from wheels W, by gearing, as shown in the drawings, or any other convenient mode of transmitting their motion. The heads $p$ pass under the mould-board of the plough, where they are supported and move upon rollers J. The fingers are arranged in reference to each other as shown in fig. 4, $ff$, being placed one over the other, and the intermediate ones, $g$, so as to occupy the horizontal range between the others, forming three distinct horizontal ranges. The number of fingers is not limited to those shown.

It will be seen that the movement of the fingers is a tossing one forwards and backwards, and upwards and downwards, thoroughly sifting the material passing from the plough to them. By the triple arrangement of the fingers described, a large space is given for the passage of earth, whilst the potatoes are sure to be caught by one or the other of the rows, and detained until the earth is entirely cleared from them.

In front of the plough projects a vine-fork, intended to pick up the vines, and draw them inwards over it. It consists of a pair of arms, G, extending obliquely downwards from the axle X, upon which they are pivoted, to a point a short distance in advance of the point of the plough. They there support or form part of the outer ends of a curved fork, F, whose form is shown in fig. 5, from the upper part of whose arch a bar, $b$, passes upwards through the pole N of the machine, by which the proper height of the fork is regulated. Behind the fork, and just over the point of the plough, is placed a roller, R. It is supported by its axis upon the arms G. It is composed of two outer disks or flanges, between which lies a double cone roller, larger at the ends than at the middle. The roller serves to back up or hold the earth raised by the front of the plough until it passes over its surface. It also holds the vines gathered by the fork by its pressure upon them, preventing them, when long, from being pulled out from the earth upon the plough, and thus forces them to pass back to the separators.

The operation of the machine is thus: The fork passing through the sides of the potato-hills, picks up and gathers the vines towards the centre of the plough, passing them under the roller. The plough passing under the hills raises up, and, aided by the roller, forces the earth, vines, and potatoes over its surface, and drops them upon the separators, which shake out and drop all the soil, leaving the potatoes with the vines, which pass to the rear, and are left in the track of the machine.

What I claim as my invention, and desire to secure by Letters Patent is, in the construction of a potato-digging machine, the following devices, substantially as described and for the purposes set forth in the within specification:

1. The construction of the separators, having three rows of fingers in their horizontal range.
2. The direct connection of the separators with the cranks.
3. The employment of the roller.
4. The combination of the roller with the fork.
5. The bent lever T.

L. AUGS. ASPINWALL.

Witnesses:
    RICH'D VARICK DEWITT,
    D. W. DEWITT.